US 7,590,065 B2

(12) United States Patent
Berreth (10) Patent No.: US 7,590,065 B2
(45) Date of Patent: *Sep. 15, 2009

(54) EQUAL-OPPORTUNITY BANDWIDTH REGULATION

(75) Inventor: Frank Berreth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

This patent is subject to a terminal disclaimer.

(21) Appl. No.: 10/912,451

(22) Filed: Aug. 4, 2004

(65) Prior Publication Data

US 2006/0031542 A1 Feb. 9, 2006

(51) Int. Cl.
*H04J 3/14* (2006.01)
*H04J 3/16* (2006.01)
*H04L 12/56* (2006.01)
*G06F 15/16* (2006.01)

(52) U.S. Cl. ............... 370/235; 370/395.4; 370/468; 709/232

(58) Field of Classification Search ............... 370/467, 370/448, 461, 442, 423, 421, 403, 429, 229–235; 375/240–240.03, 260–267, 299; 709/223, 709/225
See application file for complete search history.

(56) References Cited

U.S. PATENT DOCUMENTS

| 5,613,137 | A |   | 3/1997  | Bertram et al. |
|-----------|---|---|---------|----------------|
| 5,815,689 | A |   | 9/1998  | Shaw et al. |
| 5,875,311 | A |   | 2/1999  | Bertram et al. |
| 5,916,309 | A |   | 6/1999  | Brown et al. |
| 5,982,672 | A |   | 11/1999 | Moon et al. |
| 5,995,933 | A |   | 11/1999 | Fado et al. |
| 6,025,925 | A |   | 2/2000  | Davidson, Jr. et al. |
| 6,038,625 | A |   | 3/2000  | Ogino et al. |
| 6,044,225 | A |   | 3/2000  | Spencer et al. |
| 6,104,700 | A | * | 8/2000  | Haddock et al. ............ 370/235 |
| 6,128,317 | A | * | 10/2000 | Mackre ...................... 370/479 |
| 6,173,358 | B1|   | 1/2001  | Combs |
| 6,226,038 | B1|   | 5/2001  | Frink et al. |
| 6,259,957 | B1|   | 7/2001  | Alexander et al. |
| 6,408,351 | B1|   | 6/2002  | Hamdi et al. |
| 6,463,486 | B1|   | 10/2002 | Parry et al. |
| 6,564,330 | B1|   | 5/2003  | Martinez et al. |
| 6,567,875 | B1|   | 5/2003  | Williams et al. |
| 6,629,001 | B1|   | 9/2003  | Vadivelu |
| 6,714,724 | B1|   | 3/2004  | Cook |
| 6,842,830 | B2|   | 1/2005  | Khare et al. |
| 6,956,818 | B1| * | 10/2005 | Thodiyil ...................... 370/230 |
| 7,131,135 | B1|   | 10/2006 | Virag et al. |

(Continued)

OTHER PUBLICATIONS

Intel I/O Controller Hub 6 (ICH6) High Definition Audio / AC '97; Programmer's Reference Manual (PRM); Intel Document No. 302349-001, Jun. 2004, p. 1-207.

(Continued)

*Primary Examiner*—Tri H Phan
(74) *Attorney, Agent, or Firm*—Lee & Hayes, PLLC (57) ABSTRACT

Systems and methods for equal opportunity bandwidth regulation are described. In one aspect, data is received from a transmitting entity of one or more transmitting entities. Responsive to receiving the data, the data is transmitted across a bus to a target entity. This transmission is accomplished by dynamically regulating data transmission bandwidth on the bus such that each data transmitting entity of the transmitting entities has a substantially equal opportunity to have bus bandwidth allocated to transmit data associated with the data transmitting entity.

35 Claims, 3 Drawing Sheets

U.S. PATENT DOCUMENTS

| | | | |
|---|---|---|---|
| 7,155,543 B2* | 12/2006 | Lee et al. .................... 710/58 | |
| 7,194,564 B2 | 3/2007 | Hauck et al. | |
| 2002/0116186 A1 | 8/2002 | Strauss et al. | |
| 2002/0178210 A1 | 11/2002 | Khare et al. | |
| 2003/0009654 A1 | 1/2003 | Nalawadi et al. | |
| 2003/0088326 A1 | 5/2003 | Du et al. | |
| 2004/0003137 A1 | 1/2004 | Callender et al. | |
| 2004/0128402 A1 | 7/2004 | Weaver et al. | |
| 2004/0162911 A1* | 8/2004 | Sperschneider et al. ..... 709/231 | |
| 2004/0268061 A1 | 12/2004 | Khare et al. | |
| 2005/0060368 A1 | 3/2005 | Wang et al. | |
| 2005/0195752 A1 | 9/2005 | Amin et al. | |
| 2005/0226233 A1 | 10/2005 | Kryuchkov et al. | |
| 2006/0031607 A1* | 2/2006 | Berreth ..................... 710/52 | |
| 2006/0041895 A1* | 2/2006 | Berreth ..................... 719/328 | |
| 2007/0220279 A1 | 9/2007 | Northcutt et al. | |

OTHER PUBLICATIONS

High Definition Audio Specification Revision 1.0; Intel, Apr. 15, 2004, pp. i-174.

"Audio Codec '97" Intel Revision 2.3 Revision 1.0, Apr. 2002, 108 pages.

Jarrar et al.; "Designing in Azalia for High Performance Audio" Intel Developer Forum, Sep. 2003, 36 pages.

Analog Devices, "AC'97 SoundPort Codec AD1819B," 1999, pp. 1-28.

"Intel 82801EB (ICH5) I/O 82801ER (ICH5R), and 82801DB (ICH4) Controller Hub: AC '97 PRM," AC '97 Programmer's Reference Manual, Apr. 2003, pp. 1-53.

"A DSP/BIOS Generic DMA McBSP Device Driver for TMS320C5000 DSPs", Software Development Systems, Texas Instruments, Jun. 2003, pp. 1-11.

* cited by examiner

Fig. 3 though we use US 7,590,065 B2

EQUAL-OPPORTUNITY BANDWIDTH REGULATION

TECHNICAL FIELD

The technical field of the invention pertains to bus driver data transfers.

BACKGROUND

In a system where multiple entities request data transfers over a shared bus there needs to be an arbiter that decides who's data request gets serviced at a given time and how much of the data gets transferred.

SUMMARY

Systems and methods for equal opportunity bandwidth regulation are described. In one aspect, data is received from an arbiter of one or more transmitting entities. Responsive to receiving the data, the data is transmitted across a bus to a target entity. This transmission is accomplished by dynamically regulating data transmission bandwidth on the bus for each entity that wants to submit data such that each data transmitting entity has a substantially equal opportunity to transmit data on the bus.

BRIEF DESCRIPTION OF THE DRAWINGS

In the figures, the left-most digit of a component reference number identifies the particular figure in which the component first appears.

DETAILED DESCRIPTION

Exemplary Problem Description

In systems that allow multiple device drivers to communicate with respective ones of multiple codecs, there is a fixed bandwidth for data transfers on the bus that connects the codecs to the controllers. When multiple drivers request transfer of commands (or data packets) over the bus to one or more codecs, bus driver logic typically either uses a priority or an opportunistic command transfer scheme. A priority scheme may, for example, assign bus bandwidth to the command transfers as a function of command packet size, the number of commands in each packet, and/or the like. For example, a particular priority scheme may send packets that include fewer commands than a particular threshold number of commands to a codec before sending packets with an equal or greater number of commands. This means that a codec may receive commands in a different order than the order specified by the command sending driver(s). From the perspective of a device driver, use of such a priority-based scheme for command transfers may result in delayed command processing due to delayed codec responses to commands that are received by the codec in an order other than that specified by the device driver.

A bus driver that implements an opportunistic bus transfer scheme sends commands sequentially to a codec (i.e., in the same order that the commands were received from the bus driver). At first glance it may appear that such a command transfer scheme would solve the problems discussed above with respect to priority based command transfers. However, it does not; it just introduces different dynamics that may also result in delayed command processing. For example, if a particular class driver sends a substantially significant number of commands and/or substantially large commands to a codec, the bus driver will utilize the fixed bus bandwidth to the exclusion of all other driver command transfers until all of the particular class driver's command transfers have completed. Thus, from the perspective of a class driver that does not have substantially immediate access to the bus, use of such an opportunistic scheme for command transfers may also result in delayed command processing due to delayed receipt of codec responses.

Although the above limitations of bus bandwidth regulation have been discussed with respect to systems comprising device drivers, codecs, etc., such problems are not limited to such systems. For example, any type of software application or hardware device can send a command or a data packet across a bus to a target entity; the target entity can be any entity configured to receive the packet such as a target software application or hardware.

An Exemplary Architecture

Figure 1:
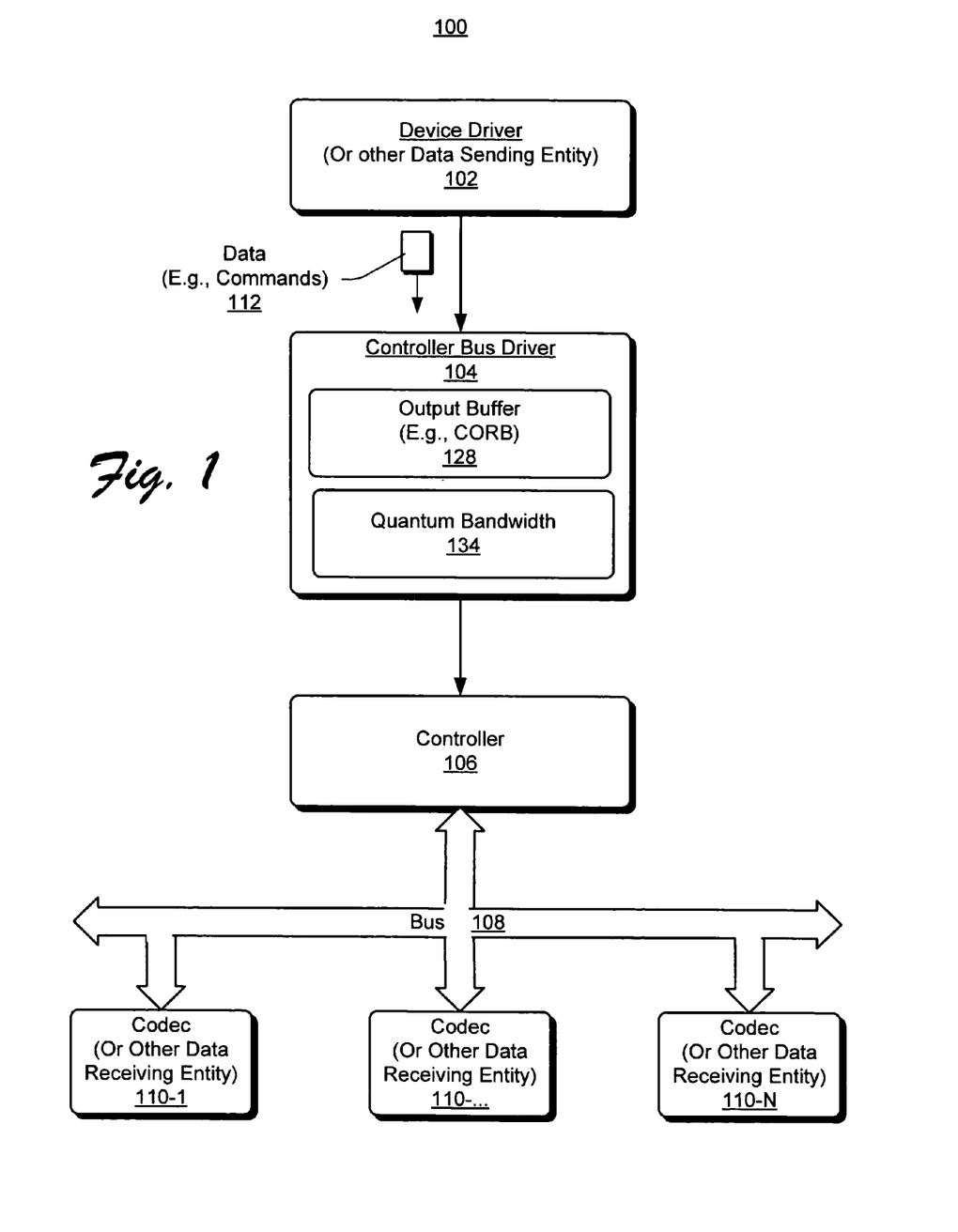
FIG. 1 shows an exemplary system for equal opportunity bandwidth regulation. For purposes of discussion, the term bus applies to a physical bus like the PCI bus, a High Definition (HD) Audio bus, and/or a logical bus like a wireless connection.

FIG. 1 shows an exemplary audio device driver architecture 100 for equal opportunity bandwidth regulation of data transfers over a bus in a system where multiple audio device drivers may communicate with respective ones of multiple codecs. Architecture 100 is implemented in a computing device such as a general purpose computer. Components of such an exemplary computing device are described below in reference to FIG. 3. Referring to FIG. 1, architecture 100 includes device driver 102, controller bus driver ("bus driver") 104, and controller 106 coupled across bus 108 to one or more codec(s) 110-1 through 110-N. In one implementation, a codec 110 is an audio codec such as a High Definition Audio audio codec. Bus 108 is an internal bus such as the High Definition Audio bus that connects the codec(s) 110 with the controller 106.

Device driver(s) 102 interface with bus driver 104 to send data 112 (e.g., data packets, command(s), etc.) to targeted ones of codec(s) 110. For purposes of this discussion, a targeted codec is a targeted entity. Responsive to receiving the data 112, bus driver 104 fills the Output Buffer 128 with the data received and communicates it to a target codec 110 via controller 106. This is accomplished such that if multiple device drivers 102 are sending respective data 112 at a substantially same time, bus driver 104 ensures that the device driver(s) 102 data transfers being requested equally share bandwidth available on bus 108. An exemplary procedure for this dynamic bus bandwidth allocation is now described in greater detail with reference to FIG. 2.

Although data sending component 102 has been described as a device driver, data receiving component 110 has been described as a codec, and intermediaries have been respectively described as a bus driver 104 and a controller 106, any combination of data sending component 102, data receiving component(s) 110, and intermediaries (if any) can be any combination of hardware or software-program entities. Thus, the systems and methods for equal opportunity bandwidth regulation are not limited to device driver, bus driver, controller, and/or codec architectures.

An Exemplary Procedure

Figure 2:
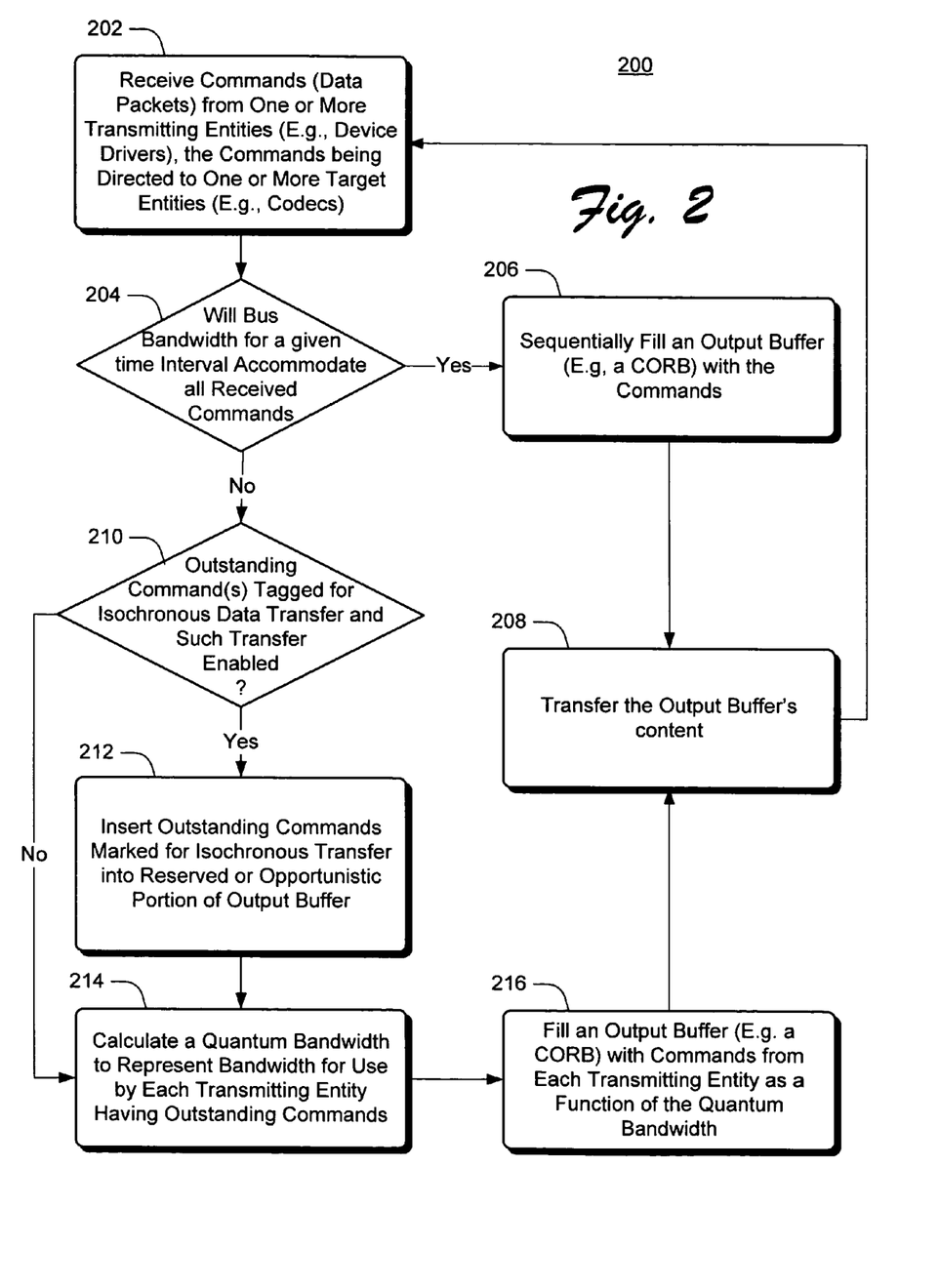
FIG. 2 shows an exemplary procedure for equal opportunity bandwidth regulation.

FIG. 2 shows an exemplary procedure 200 for equal opportunity bandwidth regulation. For purposes of discussion and illustration, the operations of procedure 200 are described in reference to aspects of FIG. 1. In all figures, a left-most digit of a component or operation reference number identifies the particular figure in which the component first appears. Referring to FIG. 2, at block 202, controller bus driver 104 (FIG. 1) receives commands 112 from one or more data sending entities such as a device driver 102 (or a computer-program). At block 204, bus driver 104 determines whether bandwidth for a given time interval on bus 108 will accommodate commands 112. In one implementation, this operation includes counting the total number of commands 112, wherein each command 112 has a particular byte size. Available bus 108 bandwidth for a given time period is known. If all commands 112 will fit within the determined available bandwidth, at block 206, bus driver 104 sequentially fills an output buffer 128 with all of the commands 112. In one implementation, the output buffer 128 is a CORB. At block 208, bus driver 104 communicates command(s) 112 to targeted ones of receiving entities such as codec(s) 110.

At block 204, if bus driver 104 determined that all commands 112 would not fit into the calculated available bandwidth, the procedure continues at block 210. At block 210, it is determined if there is an outstanding commands 112 tagged for isochronous data packet transfer and isochronous data packet transfer is enabled. For purposes of discussion, an outstanding command 112 is a command 112 that has not been inserted into output buffer 128. Isochronous data packet transfer enables a device driver 102 to specify that a particular data packet transfer operation is to be completed independent of whether the associated data packet 112 was eligible for data packet transfer as per the operations of block 212, which are governed by dynamic bandwidth assignments to respective ones of device driver(s) 102 with outstanding data packet transfers. In this implementation, a data packet 112 is tagged for isochronous data packet transfer in the data packet information 120 associated with the data packet 112. If command(s) 112 tagged for isochronous data transfer are not identified at block 210, the procedure continues at block 214, as described below. If command(s) 112 tagged for isochronous data transfer are identified at block 210, the procedure continues at block 212, where bus driver 104 inserts the tagged commands 112 into a portion of the output buffer 128 reserved for such isochronous data packet transfers.

In one implementation, the portion of output buffer 128 for isochronous data packet transfers is not reserved but opportunistic. In either case, reserved isochronous space in the output buffer may be freed if not used and added to the portion of the output buffer used for normal commands transfer, which is asynchronous command transfer.

At block 214, bus driver 104 calculates a quantum bandwidth 134 of bus 108. In one implementation, the quantum bandwidth 134 is a function of the total amount of bus 108 bandwidth available for a given time frame with respect to commands 112 from all device drivers 102 of a given byte size, divided by the number of device drivers 102 having outstanding commands 112. The quantum bandwidth 134 indicates the number of commands 112 that can be sent per considered data sending entity (e.g., device driver 102). In view of the above, the quantum bandwidth 134 is dynamic, being a function of the number of device driver(s) 102 with outstanding commands 112 for transfer across bus 108.

At block 216, for each device driver 102 with outstanding commands 112, bus driver fills output buffer 128 with a number of commands 112 from the device driver 102, wherein the number of commands 112 as specified by the assigned quantum bandwidth 134. This operation is performed such that the commands 112 are filled into output buffer 128 for a given device driver 102 until the quantum bandwidth 134 is met. If the quantum bandwidth for the given device driver 102 is utilized, any remaining commands 112 associated with the given device driver 102 are temporarily skipped (not placed into output buffer 128) and processing of commands 112 associated with a device driver 102 is limited to device driver(s) 102 that did not reach the quantum bandwidth 134 amount of data to send.

In one implementation, the operations of block 216 may assign any unused bandwidth of a particular entity (e.g., device driver(s) 102) to one or more different entities that have more than the quantum amount of data (e.g., commands 112) to send, effectively increasing the available quantum bandwidth 134 for the one or more different entities. Assigning unused bandwidth to entities with additional data to communicate, effectively reduces the amount of any unused (e.g., wasted) bandwidth on bus 108.

Procedure 200 continues at block 208, wherein bus driver 104 communicates commands 112 to targeted ones of codec(s) 110.

The exemplary operations of procedure 200 provide substantially equal opportunity regulation of bandwidth by providing each data sending entity with a same quantum amount of the available bandwidth. This bandwidth regulation is independent of when a sending entity obtains actual access to a bus to send data.

An Exemplary Operating Environment

Figure 3:
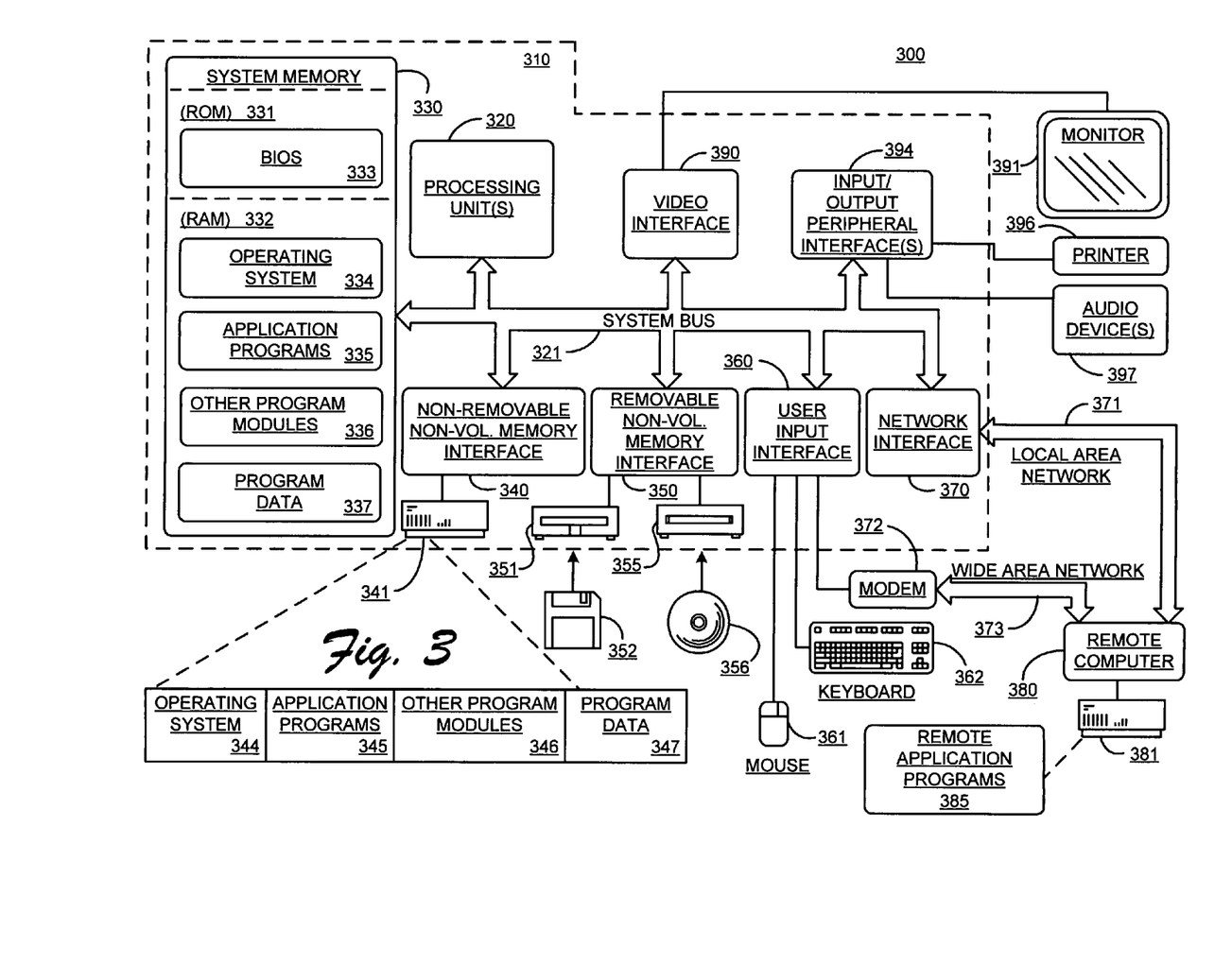
FIG. 3 shows an exemplary suitable computing environment on which systems, apparatuses and methods for equal opportunity bandwidth regulation may be fully or partially implemented.

FIG. 3 illustrates an example of a suitable computing environment 300 on which the system 100 of FIG. 1 and the procedure 200 of FIG. 2 providing bandwidth regulation for bus data transfers may be fully or partially implemented. Accordingly, aspects of this computing environment 300 are described with reference to exemplary components and operations of FIGS. 1 and 2. The left-most digit of a component or operation (procedural block) reference number identifies the particular figure in which the component/operation first appears. Exemplary computing environment 300 is only one example of a suitable computing environment and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in implementation having limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system providing bandwidth regulation for output buffer data transfers includes a general purpose computing device in the form of a computer 310. Components of computer 310 may include, but are not limited to, processing unit(s) 320, a system memory 330, and a system bus 321 that couples various system components including the system memory to the processing unit 320. The system bus 321 is an exemplary implementation of a bus coupled to a controller 106 (FIG. 1) and may be any of several types of bus structures including a memory bus or memory controller, a peripheral bus, and a local bus using any of a variety of bus architectures. By way of example and not limitation, such architectures may include Industry Standard architecture (ISA) bus, Micro Channel architecture (MCA) bus, Enhanced ISA (EISA) bus, Video Electronics Standards association (VESA) local bus, a USB, wireless, and Peripheral Component Interconnect (PCI) bus also known as Mezzanine bus or PCI Express bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331.

RAM 332 typically includes data and/or program modules that are immediately accessible to and/or presently being operated on by processing unit 320. By way of example and not limitation, FIG. 3 illustrates operating system 334, application programs 335, other program modules 336, and program data 338. In one implementation, operating system 334 comprises device driver(s) 102 or any other computer-program logic, such a computer-program, to communicate data to bus driver 104 for transfer across a bus 108 to a receiving entity. Other program module(s) 336 includes, for example, a bus driver 104 to at least regulate bandwidth for output buffer 128 data packet 112 transfers to target entities such as codec(s) 110, etc. Application programs 335 also include, for example, one or more computer-program applications that operate under operating system 334 that may send data (e.g., commands) to bus driver 104 for transfer across a bus 108 to a receiving entity such as codec(s) 110.

Program data 337 includes, for example, data or command(s) 112, bandwidth calculations such as a quantum bandwidth 134, a flag indicating whether isochronous data packet transfer is enabled, render and capture audio streams associated with respective ones of codec(s) 110, parameters for respective ones of command(s) 112, intermediate calculations, other data, etc.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 348. Note that these components can either be the same as or different from operating system 334, application programs 335, other program modules 336, and program data 338. Operating system 344, application programs 345, other program modules 346, and program data 348 are given different numbers here to illustrate that they are at least different copies.

A user may enter information into the computer 310 through input devices such as a keyboard 362 and pointing device 361, commonly referred to as a mouse, trackball or touch pad. Other input devices (not shown) may include a microphone (audio capture) audio device, joystick, game pad, satellite dish, scanner, or the like. These and other input devices are often connected to the processing unit 320 through a user input interface 360 that is coupled to the system bus 321, but may be connected by other interface and bus structures, such as a parallel port, game port, a universal serial bus (USB), IEEE 1394 AV/C bus, PCI bus, and/or the like.

A monitor 391 or other type of display device is also connected to the system bus 321 via an interface, such as a video interface 390. In addition to the monitor, computers may also include other peripheral output devices such as audio device(s) 397 and a printer 396, which may be connected through an output peripheral interface 394. In this implementation, respective ones of input and/or output peripheral interface(s) 394 encapsulate operations of audio devices 397, which include codec(s) 110 of FIG. 1.

The computer 310 may operate in a networked environment using logical connections to one or more remote computers, such as a remote computer 380. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 383, but may also include other networks. Such networking environments are commonplace in offices, enterprise-wide computer networks, intranets and the Internet.

When used in a LAN networking environment, the computer 310 is connected to the LAN 381 through a network interface or adapter 380. When used in a WAN networking environment, the computer 310 typically includes a modem 382 or other means for establishing communications over the WAN 383, such as the Internet. The modem 382, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods providing bandwidth regulation for output buffer data transfers have been described in language specific to structural features and/or methodological operations or actions, it is understood that the implementations defined in the appended claims are not necessarily limited to the specific features or actions described. Accordingly, the specific features and actions are disclosed as exemplary forms of implementing the claimed subject matter.

The invention claimed is:

1. A method comprising:
   receiving, by a computing device, data from one or more transmitting entities, wherein the data comprises multiple data packets; and
   transmitting, by the computing device, the data across a bus to a target entity by dynamically regulating data transmission bandwidth for a transmitting entity on the bus such that each data transmitting entity of the one or more transmitting entities has a substantially equal opportunity to transmit data associated with the data transmitting entity,
   wherein dynamically regulating the bandwidth includes:
      determining, for a given time period, that the bus will not accommodate every one of the multiple data packets;
      calculating a quantum bandwidth value based on a byte size of each data packet and a total number of the one or more transmitting entities; and
      for each of the one or more transmitting entities, filling an output buffer with a number of data packet(s) associated with the transmitting entity based on the quantum bandwidth value.

2. A method as recited in claim 1, wherein the transmitting is associated with a command output ring buffer (CORB) transmitting the data to the target entity.

3. A method as recited in claim 1, wherein the dynamically regulating is a function of a specific configurable or dynamically changing time interval.

4. A method as recited in claim 1, wherein the data is from one or more device drivers or a computer-program, and wherein the data is received by a bus driver.

5. A method as recited in claim 1, wherein the data comprises a command from a device driver or a data packet from a computer-program.

6. A method as recited in claim 1, wherein the bus is a high definition audio bus.

7. A method as recited in claim 1, wherein dynamically regulating the bandwidth comprises determining, for a given time period, if the bus will accommodate all of the data.

8. A method as recited in claim 1, wherein dynamically regulating the bandwidth comprises:
   determining, for a given time period, that the bus will accommodate the data; and
   filling an output ring buffer with the data.

9. A method as recited in claim 1, further comprising:
   identifying a portion of the data that is tagged for isochronous command transfer;
   determining that isochronous data transfer is enabled; and
   inserting the portion into a portion of an output buffer reserved for isochronous transfer.

10. A method as recited in claim 1, wherein the target entity is a codec.

11. A method as recited in claim 10, wherein the codec is a high definition codec.

12. A method as recited in claim 1, wherein the filling comprises:
   determining that the transmitting entity is associated with a number of outstanding data packets greater than accounted for by the quantum bandwidth value; and
   only filling the output buffer with the quantum bandwidth value number of the outstanding data packets.

13. A method as recited in claim 12, wherein the filling further comprises filling at least a portion of the number of outstanding data packets into the output buffer after the one or more data packets associated with a next transmitting entity of the one or more transmitting entities have been inserted into the output buffer.

14. A computer-readable medium that stores computer-program instructions that, when executed on a computer, perform the following steps:
   receiving data from one or more transmitting entities, wherein the data comprises multiple data packets; and
   transmitting the data across a bus to a target entity by dynamically regulating data transmission bandwidth for a transmitting entity on the bus such that each data transmitting entity of the one or more transmitting entities has a substantially equal opportunity to transmit data associated with the data transmitting entity,
   wherein dynamically regulating the bandwidth includes:
      determining, for a given time period, that the bus will not accommodate every one of the multiple data packets;
      calculating a quantum bandwidth value based on a byte size of each data packet and a total number of the one or more transmitting entities; and
      for each of the one or more transmitting entities, filling an output buffer with a number of data packet(s) associated with the transmitting entity based on the quantum bandwidth value.

15. A computer-readable medium as recited in claim 14, wherein the transmitting is associated with command output ring buffer (CORB) transfers of the data to the target entity.

16. A computer-readable medium as recited in claim 14, wherein the dynamically regulating comprises dynamically regulating as a function of a specific configurable or dynamic changing time interval.

17. A computer-readable medium as recited in claim 14, wherein the bus is a high definition audio bus.

18. A computer-readable medium as recited in claim 14, wherein the dynamically regulating the bandwidth comprises determining, for a given time period, if the bus will accommodate all of the data.

19. A computer-readable medium as recited in claim 14, wherein the dynamically regulating the bandwidth comprises:
   determining, for a given time period, that the bus will accommodate the data; and
   filling an output ring buffer with the data.

20. A computer-readable medium as recited in claim 14, wherein the computer-program instructions, when executed on the computer, further perform the following steps:
   identifying a portion of the data that is tagged for isochronous command transfer;
   determining that isochronous data transfer is enabled; and
   inserting the portion into a portion of an output buffer reserved for isochronous transfer.

21. A computer-readable medium as recited in claim 14, wherein the target entity is a computer-program executable by the processor or a hardware device.

22. A computer-readable medium as recited in claim 14, wherein the filling further comprises:
   determining that the transmitting entity is associated with a number of outstanding data packets greater than accounted for by the quantum bandwidth value; and
   only filling the output buffer with the quantum bandwidth value number of the outstanding data packets.

23. A computer-readable medium as recited in claim 22, wherein the filling further comprises filling at least a portion of the number of outstanding data packets into the output buffer after the one or more data packets associated with a next transmitting entity of the one or more transmitting entities have been inserted into the output buffer.

24. A computing device comprising:
   a processor; and
   a memory coupled to the processor, the memory storing computer-program instructions that, when executed on the computing device, perform the following steps:
   receiving data from one or more transmitting entities, wherein the data comprises multiple data packets; and
   transmitting the data across a bus to a target entity by dynamically regulating data transmission bandwidth for a transmitting entity on the bus such that each data transmitting entity of the one or more transmitting entities has a substantially equal opportunity to transmit data associated with the data transmitting entity,
   wherein dynamically regulating the bandwidth includes:
      determining, for a given time period, that the bus will not accommodate every one of the multiple data packets;
      calculating a quantum bandwidth value based on a byte size of each data packet and a total number of the one or more transmitting entities; and
      for each of the one or more transmitting entities, filling an output buffer with a number of data packet(s) associated with the transmitting entity based on the quantum bandwidth value.

25. A computing device as recited in claim 24, wherein the transmitting is performed via command output ring buffer (CORB) transfers of the data to the target entity.

26. A computing device as recited in claim 24, wherein the dynamically regulating comprises dynamically regulating as a function of a specific configurable or dynamic changing time interval.

27. A computing device as recited in claim 24, wherein the data is from a computer-program executable by the processor or one or more device drivers, and wherein the data is received by a bus driver.

28. A computing device as recited in claim 24, wherein the dynamically regulating the bandwidth comprises determining, for a fixed time period, if the bus will accommodate all of the data.

29. A computing device as recited in claim 24, wherein the dynamically regulating the bandwidth comprises:
   determining, for a given time period, that the bus will accommodate the data; and
   filling an output ring buffer with the data.

30. A computing device as recited in claim 24, wherein the computer-program instructions, when executed on the computing device, further perform the following steps:
   identifying a portion of the data that is tagged for isochronous command transfer;
   determining that isochronous data transfer is enabled; and
   inserting the portion into a portion of an output buffer reserved for isochronous transfer.

31. A computing device as recited in claim 24, wherein the target entity is a computer-program or a hardware device.

32. A computing device as recited in claim 24, wherein the filling the output buffer further comprises:
   determining that the transmitting entity is associated with a number of outstanding data packets greater than accounted for by the quantum bandwidth value; and
   only filling the output buffer with the quantum bandwidth value number of the outstanding data packets.

33. A computing device comprising:
   receiving means to receive data from a transmitting entity of one or more transmitting entities, wherein the data comprises multiple data packets; and
   transmitting means to transmit the data across a bus to a target entity, the transmitting comprising:
   dynamically regulating means to dynamically regulate data transmission bandwidth for assignment to a transmitting entity such that each data transmitting entity of the one or more transmitting entities has a substantially equal opportunity to have bus bandwidth allocated to transmit data associated with the data transmitting entity,
   wherein the dynamically regulating means includes:
      determining means to determine, for a fixed time period, that the bus will not accommodate every one of the multiple data packets;
      calculating means to calculate a quantum bandwidth value based on a byte size of all data packet(s) submitted by the one or more transmitting entities and a total number of the one or more transmitting entities; and
      for each of the one or more transmitting entities, sequentially filling means to fill an output buffer with a number of data packet(s) bytes associated with the transmitting entity based on the quantum bandwidth value.

34. A computing device as recited in claim 33, wherein the sequentially filling means comprises:

determining means to determine that the transmitting entity is associated with a number of outstanding data packets greater than accounted for by the quantum bandwidth value; and filling means to only fill the output buffer with the quantum bandwidth value number of outstanding data packet(s) bytes.

35. A computing device as recited in claim 34, wherein the sequentially filling means further comprises filling means to fill at least a portion of the number of outstanding data packets into the output buffer after the one or more data packets associated with a next transmitting entity of the one or more transmitting entities have been inserted into the output buffer.

* * * * *